Jan. 10, 1928.

B. M. SHIPLEY 1,655,570

CASH REGISTER

Filed April 23, 1923

Inventor
Bernis M. Shipley
By Earl Beust
Henry E. Stauffer
His Attorneys

Jan. 10, 1928.
B. M. SHIPLEY
1,655,570
CASH REGISTER
Filed April 23, 1923    5 Sheets-Sheet 2
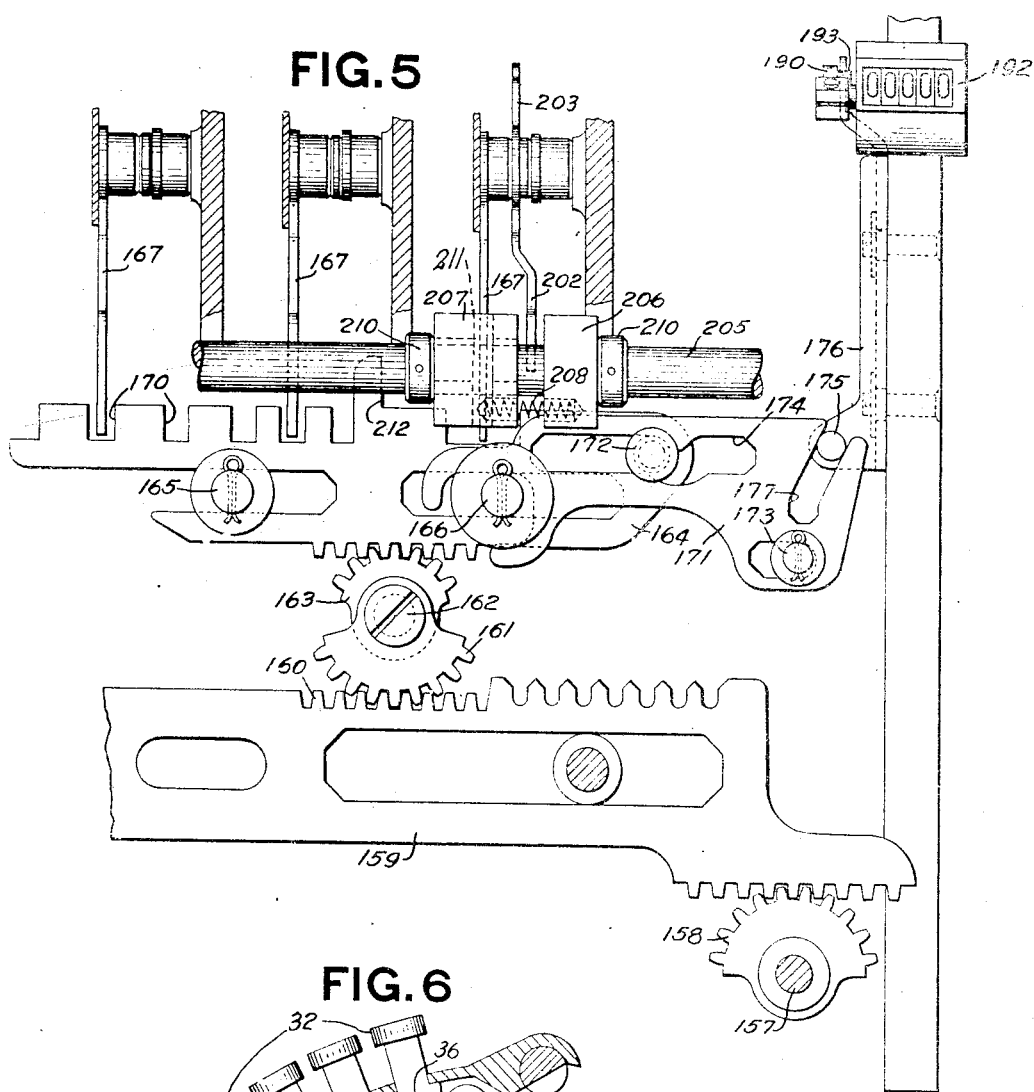
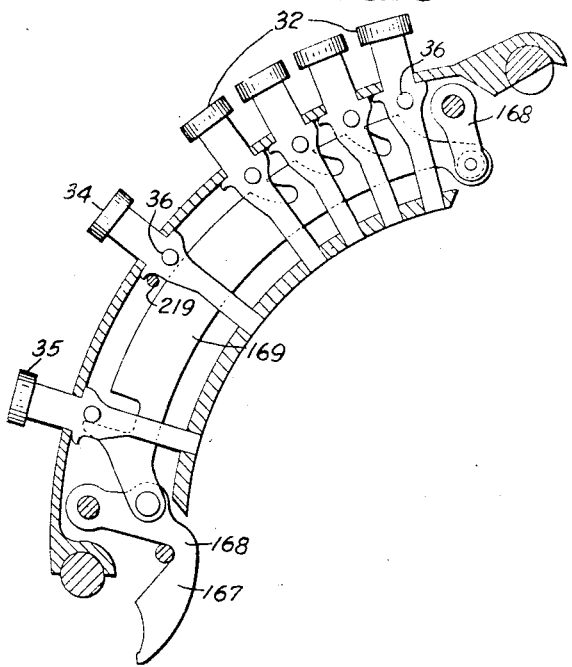
Inventor
Bernie M. Shipley
By Carl Beust
Henry E. Stauffer
His Attorneys Jan. 10, 1928.

B. M. SHIPLEY 1,655,570

CASH REGISTER

Filed April 23, 1923

Inventor
Bernis M. Shipley
By Cearl Beust
Henry E. Stauffer
His Attorneys

Jan. 10, 1928.

B. M. SHIPLEY 1,655,570

CASH REGISTER

Filed April 23, 1923     5 Sheets-Sheet 4

Inventor
Bernis M. Shipley
By Carl Beust
Henry E Stauffer
His Attorneys

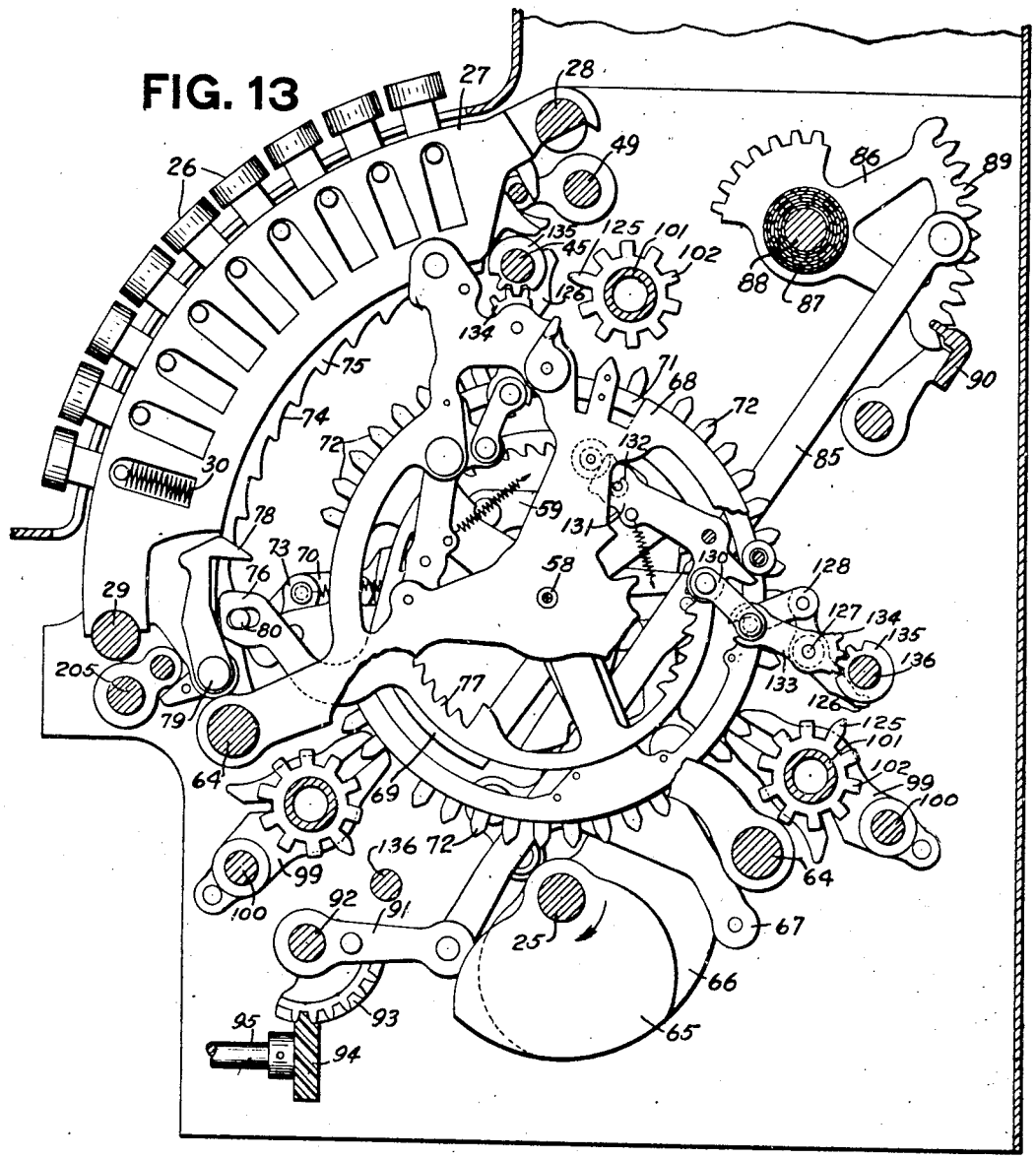

Patented Jan. 10, 1928.

1,655,570

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed April 23, 1923. Serial No. 634,014.

This invention relates to cash registers and the like and more particularly to machines of the type shown and described in Letters Patent of the United States, No. 1,230,864, issued to W. A. Chryst, on June 26, 1917, and Letters Patent of the United States, No. 1,242,170 and No. 1,394,256, issued to F. L. Fuller, on Oct. 9, 1917, and Oct. 18, 1921, respectively.

The principal object of this invention is to provide a cash register having a plurality of totalizers and so constructed that the clerks using the same can only reset a certain one of said totalizers. The manager can read all the totalizers, but only reset certain ones, while the proprietor can both read and reset all of them.

With this and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 5 is a detail front elevation of portions of the three release banks and the locking mechanism which cooperates therewith.

Fig. 6 is a detail sectional view of the release bank, showing the detent used in locking out the clerks' keys when taking totals from the second and third banks.

Fig. 13 is a detail sectional view taken through the machine just to the right of one of the amount banks.

General description.

It is thought that a short description of the system which is to be used with this machine will help to bring out the various features thereof. The machine is provided with any suitable number of amount banks and with three banks of control keys. The first, or right hand, control bank is devoted to the four clerks' initials, the List key and a key marked "Read", the use of which will be described later. The second, or center, bank of control keys is devoted to departments, while the third, or left hand, bank is for transactions. In ordinary adding operations the clerk will depress first a key in the transaction bank, such as Cash, Charge, etc., then a key in the department bank, depending upon the branch of the business the transaction was made in, and finally he will depress his particular initial key, A, B, D or E. As is well known in the art in machines of this type, each of the keys depressed in the control banks selects a particular totalizer corresponding thereto for operation so that the amount of the transaction will be added into each of these totalizers.

Figure 11:
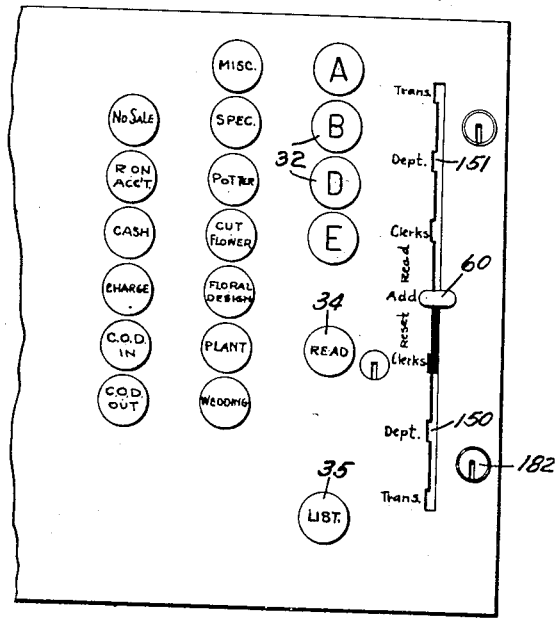
Fig. 11 is a diagrammatic view showing the three control banks and the total lever, together with the locks which cooperate therewith.

It may sometimes be desired to add a series of unrelated items in order to get the total thereof. In order to accomplish this result a key known as the "List" key is provided in the first position of the clerks' bank. When this key is depressed the various amounts set up on the keyboard will be added on the "List" totalizer. When it is desired to take a total from this totalizer it is necessary to move the total lever from its adding position, in which it is shown in Fig. 11, to the first position below adding, and in this position the machine will be released by the depression of the "List" key, which will print the total of the items entered in the List totalizer.

It is desired to have the list key available for the use of the clerks at any time, but at the same time it is not desired to enable the clerks to read or reset the totals on their individual totalizers nor the totals on the transaction or department totalizers. In order to accomplish this function lock-controlled plates are normally in position across the total lever slot to prevent movement of this lever to the department or transaction read or reset positions and the clerks' read position, but permit movement of the total lever to the clerks' reset position in order that they may use the "List" key. Mechanism is also provided to lock the clerks' keys against depression when the total lever is moved to the clerks' Reset position and the locking plate is in position across the slot.

In the system contemplated for use with this machine it is desired that the manager have access to the clerks' keys, and also to the department keys, but not to the transaction keys for the purpose of resetting these totalizers. Therefore, the manager is provided with keys for the locks controlling the plates above mentioned. When the lower plate is moved to its ineffective position the total lever can be moved to the clerks' reset position and then the clerks' keys may be depressed and the totals standing upon the clerks' totalizers may be printed. The total lever may also be moved to the department position and the machine released by means of the list key so that upon the depression of any key in the department bank the total standing on its corresponding totalizer will be printed. If the manager unlocks the upper total lever lock the lever can then be moved to the "Read" position of any of the totalizer lines, and the amount on any totalizer printed as is common in machines of this type, but it is impossible for him to reset these totalizers by this operation. It is of course optional with the proprietor as to who shall possess the key which permits the total lever to be moved up to its "Read" position. Mechanism is provided to lock the list key, to prevent release of the machine and the printing of a total from any of the transaction totalizers when the total lever is moved down to the transaction position.

It is of course desired that the proprietor have access to all of the totalizers. Therefore, he is provided with an additional key, which, upon the operation thereof, will unlock a release key known herein as the "Read" key and which is in the clerks' or release bank. This key is not affected by the locking mechanism that prevents depression of the list key when the total lever is in the transaction reset position and therefore, when unlocked, it may be used to release the machine when any key in the transaction bank is depressed on totalizing operations. The release mechanism used in this machine is substantially the same as that shown and described in two copending applications of the present applicant, Nos. 576,924 and 628,477, filed July 24, 1922, and March 29, 1923, respectively.

Driving mechanism.

This machine may be driven by any suitable mechanism, such as a crank handle or an electric motor. The means used is connected to a main drive shaft 25 (Figs. 1 and 13) in a manner well known in the art, as shown in the patents referred to. The shaft 25 will be give one complete clockwise rotation on each operation of the machine.

Amount keys.

In this machine there are provided a plurality of banks of amount keys 26 (Fig. 13) which are slidably mounted in key frames 27 carried by a pair of rods 28 and 29 supported by the machine side frames. The keys are normally held in their undepressed positions by means of springs 30, as is well known in the art. Upon depression of any key in an amount bank the said key will be held in its depressed position by means of a detent not shown herein, but shown and described in the above mentioned patents. Near the end of the operation the depressed amount keys are released and are returned to their normal positions by the springs 30.

Transaction and department keys.

The transaction and department keys used in this machine are identical with the corresponding keys shown and described in the above mentioned patents and are not therefore shown herein. Mechanism well known in the art is provided for holding them in their depressed positions and releasing them at the end of an operation.

Release bank.

Like the amount keys above described, the release keys (Figs. 1 and 6) are slidably mounted in a key frame 33 which is supported by the rods 28 and 29 above mentioned. The group of four keys 32 at the upper end of the bank are the four clerks' keys. Below these keys the next is the "Read" key 34, and below it the "List" key 35.

Figure 1:
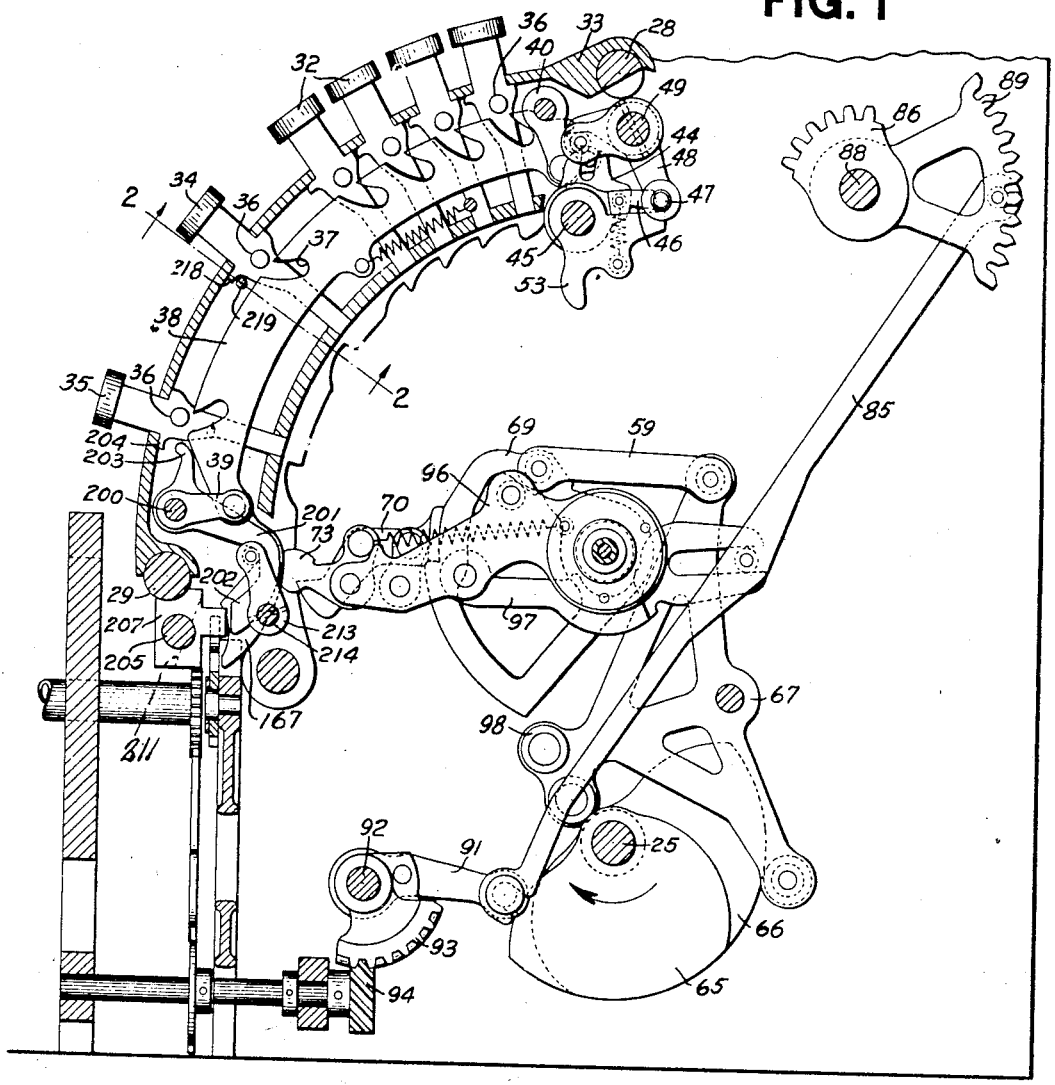
Fig. 1 is a sectional view through the machine, taken just to the right of the release bank.

The machine is normally locked and depression of any one of the clerk's keys 32, the read key 34 or the list key 35 will release the machine for operation. The mechanism whereby this is acomplished will now be described. Each of the keys 32, 34 and 35 carries a pin 36 which projects from the side of its shank and is adapted to cooperate with a corresponding curved slot 37 formed in a detent plate 38 (Fig. 1). The plate 38 is pivoted at its lower end to an arm 39 supported by the key frame, and at its upper end by an arm 40, which is also pivoted to the key frame. It can be seen from Fig. 1 that the depression of any of the keys in this bank will move the detent 38 downwardly.

Figure 10:
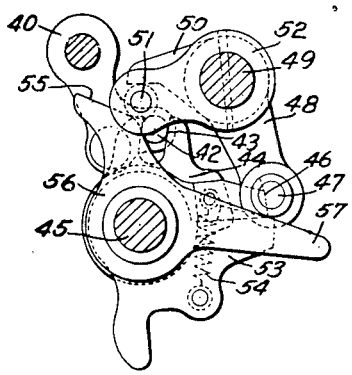
Fig. 10 is an enlarged detail view of the release mechanism.

A pin 42 (Fig. 10) carried by a projecting portion of the arm 40 projects through a bifurcated portion 43 of a member 44 loose on a shaft 45 supported by the machine side frames. A member secured to the member 44 has a projecting portion 46 which normally rests against the side of a flattened stud 47 carried by an arm 48 loose on a shaft 49 rotatably mounted in the side frames. Integral with the arm 48 is a projection 50 which lies above a pin 51 carried by an arm 52 fast on the shaft 49. The shaft 49 is constantly under the tension of a strong spring, which is not shown herein, but which is shown in the patents previously mentioned, and tends to move said shaft in a clockwise direction (Fig. 10). The shaft is prevented from moving, however, by the engagement of the stud 47 with the portion 46. When the detent 38 is rocked downwardly upon depression of a key in the release bank, the pin 42 rocks the member 44 counter-clockwise. This moves the projecting portion 46 out of the path of the stud 47, and as the shaft 49 is under spring tension, the arm 52, pin 51, projection 50 and arm 48 will all be rocked clockwise far enough to position the stud 47 between the portion 46 and a member 53 which is loose on the shaft 45 but connected with the member 44 by a spring 54. Near the end of the operation of the machine, the shaft 49 is rocked counter-clockwise slightly past normal position, and then clockwise to normal, in a manner well known in the art and shown and described in the previously mentioned patents. This movement will cause the pin 51, carried by the arm 52, to come into contact with a surface 55 of a member 56 loose on shaft 45. The member 56 has a tail 57 which is adapted to cooperate with a projecting portion of the stud 47. When the shaft 49, arm 52 and pin 51 are rocked counter-clockwise to normal position, the pin 51 will rock the member 56 counter-clockwise, and as the tail 57 thereof engages the stud 47, this stud, arm 48 and projection 50 will also be rocked counter-clockwise slightly past normal position, which will permit the projecting portion 46 to be rocked in front of the stud 47 as the detent 38 is returned to home position. It is evident from the above description that the release mechanism must be operated to unlock the machine before the operation of said machine can begin.

*Total lever.*

Figure 12:
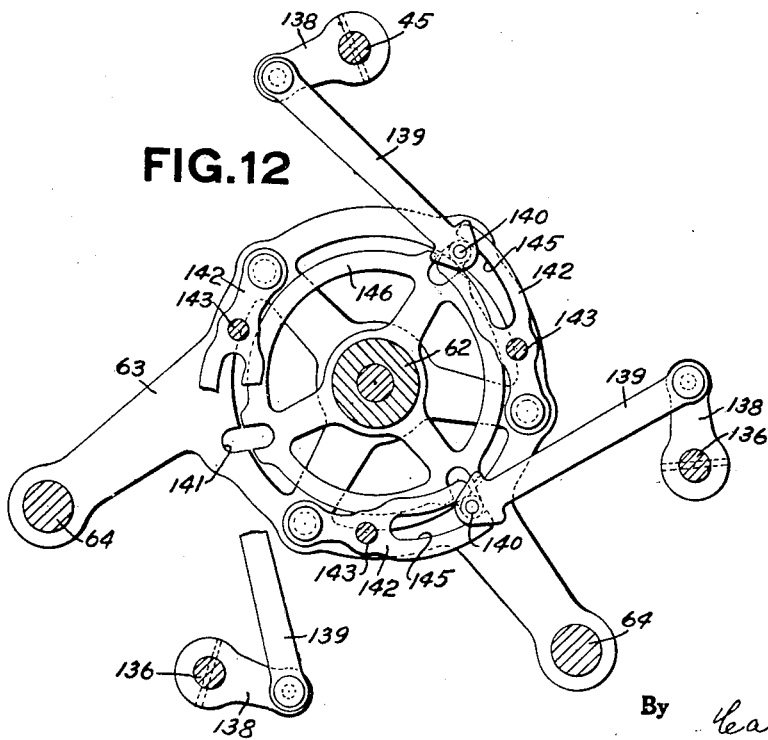
Fig. 12 is a detail sectional view of the mechanism for selecting and rocking the reset shafts on totalizing operations.

A total lever 60 (Figs. 7 and 11) is provided in this machine for controlling the selection and engagement of the proper totalizer line corresponding to the bank of control keys operated in totalizing operations. The total lever and its co-operating mechanism will be more fully described in connection with the totalizing operation. It is thought to be sufficient to state here that the lever is integral with a plate 61 which is rotatably mounted on a hub 62 mounted on a stud, supported by a pair of plates 63, one of which is shown in Fig. 12, which are in turn carried by two rods 64 mounted in the side frames of the machine.

*Amount differential mechanism.*

The differential mechanism is identically the same as that shown and described in the above mentioned patents, and therefore only a brief description thereof will be given herein. There is one differential unit for each bank of amount keys. Each of these units is driven by a pair of cams 65 and 66 (Fig. 13) fast on the main drive shaft 25. Cooperating with the cams 65 and 66 is a Y-shaped member 67 which is pivotally mounted on one of a pair of differential unit supporting-plates 68 which are in turn supported by the rods 64 above mentioned. The Y-shaped member 67 is connected by a link 59 to a driving segment 69 which is loosely mounted on a bushing 58 carried by the plates 68. This mechanism is more clearly shown in Fig. 1, which however is the first transaction bank. It will be described later. The cams 65 and 66 are so shaped as to give the driving segment 69 first a clockwise and then a counter-clockwise movement on each operation of the machine. Normally connected to the driving segment 69 by a latch member 70 are two differentially movable plates 71, between which are secured three totalizer actuating segments 72, one for each totalizer line, as is well known in the art. When the machine is operated and the driving segment 69 moved in its clockwise direction it will carry the totalizer actuating segments with it, due to the latching member 70, until a bell crank 73, which supports the forward end of the latching member 70, comes into contact with the inner end of whichever one of the keys has been depressed. When this occurs the latch connection between the driving segment and the totalizer actuating segments will be broken and the forward end of the latch 70 will engage the appropriate one of a series of notches 74 formed in a plate 75 carried by the differential supporting-plates 68. If no key in a bank is depressed the end of a projection 76 of a plate 77 will come into contact with a zero stop pawl 78 mounted on a shaft 79 carried by the key frame 27. The projection 76 is connected to the bell crank 73 by a pin 80 so that when the said projection comes into contact with the zero stop pawl 78 the bell crank 73 will be rocked and the latching connection between the driving segment 69 and the totalizer actuating segments 72 will be broken. The differential movement which is imparted to the totalizer actuating segments 72 is also transferred to a link 85 by means similar to that shown in Fig. 1 and to be described later. This link is connected at its upper end with an indicator setting-segment 86 which is fast on one of a series of sleeve 87 surrounding and supported by a shaft 88 mounted in the machine side frames. Integral with the indicator setting-segment 86 is a segmental portion 89 having teeth adapted to cooperate with an alining plate 90. The plate 90 is moved out of engagement with the teeth 89 at the beginning of an operation and re-engaged therewith at the end of an operation to properly aline the parts, as is well known in the art. At its lower end the link 85 is pivoted to an arm 91 loose on a rod 92 carried by the machine side frames. Pinned to the arm 91 is a spiral segment 93 which cooperates with a spiral pinion 94 fast on a shaft 95 which, in turn, through other mechanism not shown herein, transfers the differential movement of the corresponding totalizer actuating segment to its appropriate type wheel in the printing mechanism.

Control bank differential mechanism.

The differential mechanism which cooperates with the three banks of control keys is identically the same as that just above described in connection with the amount keys except for the fact, that, as the keys in these banks are not for adding amounts on totalizers, there are no totalizer actuating segments used in connection with these mechanisms. Instead, a differentially movable member 96 (Fig. 1) is provided which is pivotally mounted and carries the latch member 70, as above described. The same reference numerals will be used herein as have been applied to identical parts in the description of the amount differential mechanism. It is evident that when the shaft 25 is given its clockwise rotation, the driving segment 69 will be rocked first clockwise and then counter-clockwise by the Y-shaped member 67 and link 59, and when the forward end of the bell crank 73 comes into contact with the inner end of the depressed key the latch member 70 will be moved forwardly and the connection between the member 96 and the driving segment 69 will be broken. Pivoted to the member 96 is a beam 97 which is adapted to cooperate with a roller 98 carried by the Y-shaped member 67 to transfer the differential movement of the member 96 to the before described link 85.

Totalizers.

As is usual in machines of this type, this machine is provided with three lines of totalizers 101, each of said lines carrying a plurality of groups of totalizer elements, the individual totalizers consisting of one totalizer element 102 in each group (Fig. 13).

Each bank of control keys is appropriate to one of said totalizer lines and therefore the depression of any key in a control bank will select the corresponding totalizer on its appropriate line for operation. The totalizers are selected by sliding the entire totalizer lines laterally of the machine to bring any desired totalizer into alinement with the totalizer actuating segments 72. Then upon the further operation of the machine the entire line is rocked to bring the selected totalizer into engagement with the actuator 72 so that they may be rotated thereby, as is well known in the art. The mechanism for selecting the totalizer line or lines to be rocked into engagement with the actuators on adding operations is under the control of the transaction, department and clerks' keys. The mechanism for selecting the various lines in adding operations is not shown or described herein as it forms no part of the present invention and a full description thereof may be had upon reference to the above mentioned patents.

Totalizing operation.

The general operation of the mechanism on totalizing operations will first be described without reference to the various locks which form the present invention. On totalizing operations it will be remembered that only one totalizer may be engaged with the actuators, as it is the totalizer itself which controls the differential mechanism on totalizing operations. Therefore, only one bank of control keys may be used in such operations. The individual totalizer on the totalizer line appropriate to the bank containing the key which it is desired to use, will be selected and moved to its operating position in the same manner in totalizing operations as in adding operations. This mechanism is not shown herein, but a full description thereof may be had by consulting the previously mentioned patents. It will be remembered that in adding operations the particular totalizer line to be rocked into engagement with the actuators is selected by the control keys. In totalizing operations, however, this line is selected by the total lever, as is well known in the art. A brief description of the mechanism whereby the total lever selects the totalizer line to be operated will now be given. It may first be stated that each totalizer line 101 has fast thereto a pair of arms 99 (Fig. 13) slidably mounted on a shaft 100, having fastened at each end thereof an arm 103, to which is pivoted a link 104 (Fig. 7) having a pin 105 at its opposite end which is adapted to be engaged in a hook portion 106 of a three-armed spider 107. The spider 107 is adapted to be given a clockwise movement (Fig. 7) and then a counter-clockwise movement at each operation of the machine. It can be seen, therefore, that if the pin 105 on the link 104 is in engagement with the hook portion 106 of said spider, the link will be pulled with the spider upon its clockwise movement, which will rock the shaft 100 and, due to the engagement of a roller 108 carried by the arm 103 with a slot 109 in a plate 110 fast to the machine side frame, will move the totalizer line inward far enough to bring the selected totalizer elements into engagement with the actuating segments 72.

The means whereby the total lever plate 61 selects the totalizer line to be operated on totalizing operations consists of a plurality of slots 111, one for each of said totalizer lines cut in the plate 61. Cooperating with these slots are pins 112 carried by levers 113 pivotally connected to members 114. The levers 113 have slots 115 formed therein which engage with pins 116 carried by the links 104. It can be seen from Fig. 7 that when the total lever is moved downwardly the conformation of the slots 111 is such as to move the pins 112 carried by the levers 113 outwardly and then inwardly successively, that is, first the pin 112 on lever 113 corresponding to the upper totalizer line will be moved outwardly. This will rock the lever 113 clockwise about its pivotal point and through the connection of the slot 115 with pin 116 will move the link 104 counter-clockwise and bring the pin 105 into engagement with the hook portion 106 of the spider 107. Therefore, if the lever is left in this position and the machine operated when the spider 107 is given its clockwise movement, the link 104 will be moved therewith and will thereby rock the upper totalizer line into engagement with the actuators 72. If the total lever is moved to its next position either above or below its normal adding position, it will disengage the link 104 for the upper totalizer line and engage the link 104 appropriate to the back totalizer line, and if moved to its third position the link 104 for the back line will be disengaged and that for the front line engaged, as is well known in the art. Therefore, it can be seen that the position of the total lever determines which of the totalizer lines will be rocked into engagement with the actuators.

*Mechanism for breaking latch under control of totalizer wheel.*

When it is desired to take a total from any particular totalizer, the total lever is moved to the position corresponding to the totalizer line which is to be engaged, the key corresponding thereto is depressed, which will cause that totalizer to be positioned opposite the actuating segments, and then the machine is released.

The selected totalizer is moved into engagement with the actuators at the beginning of the operation and the totalizer wheels are rotated backwardly to their zero positions. Mechanism is provided to break the differential latch when the totalizer wheels arrive at their zero positions, and this mechanism will now be described.

Each totalizer wheel is provided with a long tooth 125 (Fig. 13) in its zero position. A lever 126 is pivoted at 127 to the differential supporting frame and at its opposite end is pivoted to one end of a link 128. This link is pivotally connected to a similar link 130 which is in turn pivoted to a lever 131 also supported by the differential frame, as is well known in the art. The lever 131 carries a half-round stud 132 adapted to cooperate with teeth formed on the inner periphery of the plate 77 above described.

It can be seen that links 128 and 130 form a toggle which is normally broken, as shown in Fig. 13. A lever 133 also pivoted at 127 has a bifurcated end engaging the common pivotal point of links 128 and 130. The lever 133 also has a segmental portion carrying teeth 134 engaging with the teeth of a partial gear 135 fast on a shaft 136.

In totalizing operations, the shaft 45 for the upper line, the shaft 136 for the rear line or a similar shaft 136 (Fig. 12) for the front line, is given a counter-clockwise rocking movement, depending upon which of the totalizer lines is to be engaged. The means for rocking these shafts will be later described. If for instance the rear line is to be engaged, the shaft 136 for the rear line is rocked. This movement, through gear 135 and segmental portion 134, will rock lever 133 clockwise about its pivot 127. This movement will straighten the toggle formed by links 128 and 130, which will in turn rock the lever 126 clockwise into the path of the long tooth 125 above mentioned.

Then when the totalizer wheel reaches its zero position the long tooth will strike the lever 126 and rock it counter-clockwise. As the above mentioned toggle is now straight, the movement of lever 126 will rock lever 131 clockwise and bring the stud 132 carried thereby into engagement with which ever one of the teeth of plate 77 is opposite the stud at that time. The plate 77 will thereby be stopped and through the slot and pin connection the bell crank lever 73 will be rocked, which will break the differential latch in the position corresponding to the amount previously registered on the corresponding totalizer element.

Figure 7:
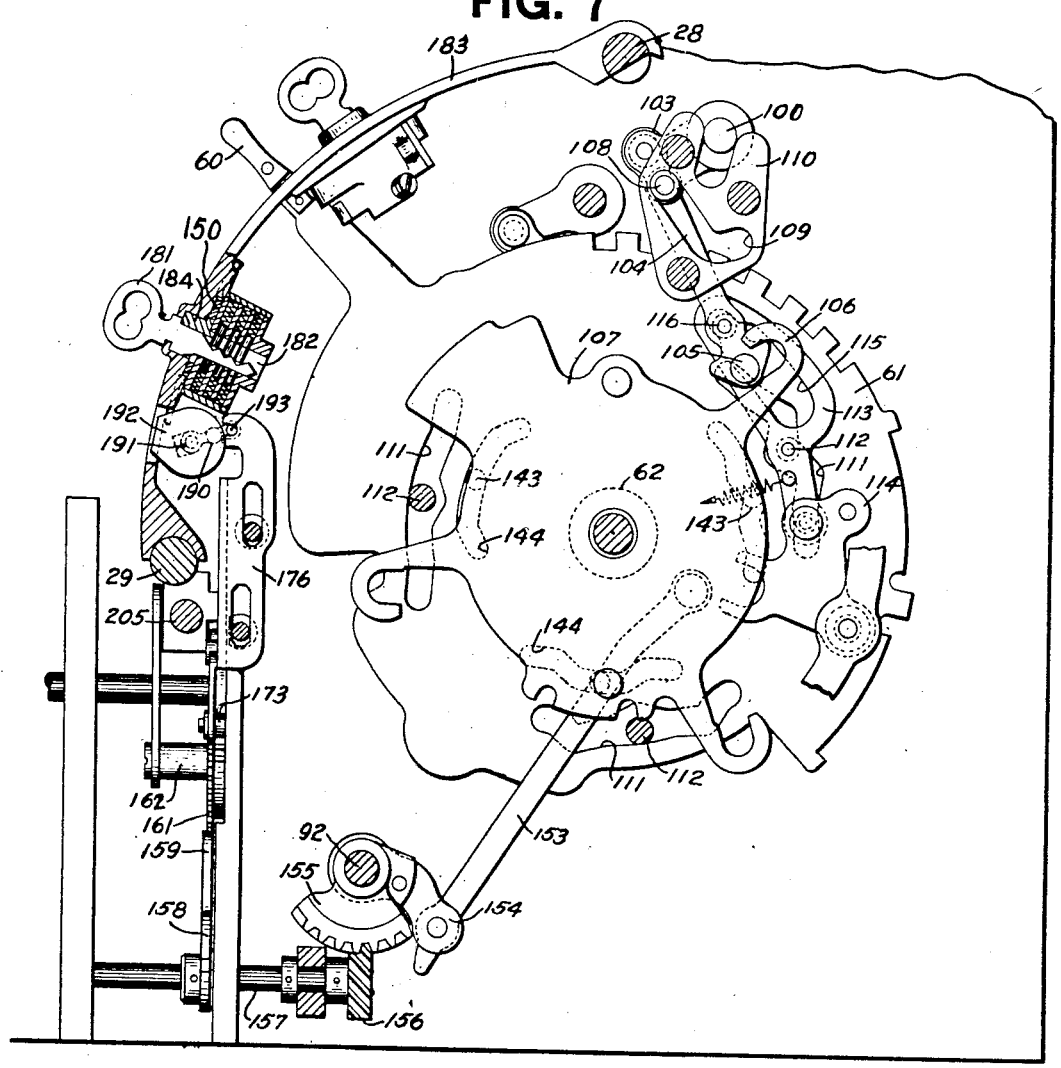
Fig. 7 is a sectional view through the machine, showing the total lever plate, a portion of the totalizer engaging mechanism and the locks for the total lever.

The mechanism for selecting and actuating the proper resetting shaft will now be described. Fast to the shaft 45 and the shafts 136 are arms 138 to which are pivoted links 139 carrying pins 140 (Fig. 12). These pins normally rest in recesses 141 formed in the supporting plate 63. Also pivoted to this plate are three arms 142 carrying pins 143 which project through slots 144 in the plate 61 (Fig. 7). These slots are so formed that the movement of the plate will move the pins 143 towards the center of the plate successively. The arms 142 have bifurcated portions 145 engaging the pins 140 (Fig. 12). Therefore, when the plate 61 moves the pins as above described, the arms 142 will rock the links 139 clockwise about their pivots and move the pins 140 from their normal positions into recesses in a circular plate 146 which is fast on the hub of the totalizer engaging spider 107. Then when the spider 107 is rocked clockwise as above described, the plate 146 will be similarly moved and the link 139 whose pin has been moved into engagement with the plate 146 will be moved and through its arm 138 will rock its appropriate shaft counter-clockwise.

Listing operation.

As above described it is sometimes necessary for the clerks to add a plurality of items for which no specific totalizer is provided. To meet this condition applicant provides a special totalizer which is selected by the list key 35 (Figs. 1, 6 and 11). When it is desired to take a total from the list totalizer it is necessary to move the total lever 60 to its first position below adding position. In the previous machines of this type the total lever is normally prevented from movement by two slidable plates 150 and 151 which obstruct the slot in which the total lever moves. In order to permit the clerks to have access to the "List" totalizer the lower one of these plates is cut off so that the total lever slot is open from the adding position to the first position below which is marked "Clerks" (Fig. 11).

This position of the total lever, however, in the previous machines, would permit the taking of totals from the four clerks' totalizers which are controlled by the four keys 32 as well as the "List" totalizer. In this machine means is provided for normally locking out the keys 32 when the total lever is moved to the "Clerk's" position. This mechanism will now be described.

Pivotally attached to the total lever plate 61 is a link 153 (Fig. 7) which is pivoted at its lower end to an arm 154 loose on the rod 92 above mentioned. The arm 154 is secured to a spiral segment 155 which engages with a spiral pinion 156 fast on a shaft 157. Also fast on this shaft is a segment 158 (Fig. 5) meshing with teeth formed on a rack 159 such as is used in the machines above mentioned. This rack slides laterally of the machine on appropriate studs and has teeth 160 formed thereon which cooperate with a segment 161 loose on a stud 162 projecting from the machine frame. Integral with segment 161 is a segment 163 which engages with teeth formed on the lower edge of a plate 164 which is slidably mounted on studs 165 and 166 also projecting from the frame.

This plate has a plurality of notches 170 cut in its upper edge which are adapted to cooperate with tails 167 projecting downward from the lower ones of pairs of arms 168 which support detents 169 (Fig. 6). There is a detent 169 and a tail 167 for each bank of control keys. As is well known in the art the detents 169 are moved downwardly upon the depression of keys in their corresponding banks due to the engagement of pins on the keys with curved slots in the detents, and thereby rock the tails 167 clockwise (Fig. 6).

When the total lever is in its normal adding position the plate 164 is so positioned that the notches 170 in said plate are opposite the tails 167 for all three banks of control keys thus permitting any key in any one of these banks to be depressed. When the total lever is moved to the "Clerks" position a solid portion of the plate 164 is placed opposite to the tails 167 for the "Dept." and "Trans." keys so that no keys in these two banks can be depressed. One of the notches 170 is opposite the tail 167 for the clerks bank however and therefore these keys could be depressed were it not for an additional plate 171 which is slidably mounted on a stud 172 supported by the plate 164 and a stud 173 projecting from the frame. The stud 172 passes through a slot 174 in the plate 171 which has a cam portion therein. When the plate 164 is moved towards the right by the movement of the total lever to the "Clerks" position the cam portion of slot 174 will contact with the pin 172 and rock said plate clockwise about a pin 175 mounted on a plate 176 and projecting through a slot 177 in plate 171. This camming action will cause the left hand end of the plate 171 to be raised into the path of movement of the tail 167 for the "clerks" bank and thereby prevent the depression of the four clerks' keys 32. It is evident that if the total lever is moved upwardly to its read positions the plate 164 will be moved to the left. During this movement the pin 172 will not encounter any cam portion of slot 174 and therefore the plate 175 will not be rocked into the path of the tail for the clerks' bank. The clerks' keys can then be depressed for the purpose of taking a sub-total.

As can be seen in Fig. 6, the detent 169 has a cutaway portion opposite the pin on the "List" key 35 and therefore the depression of this key has no effect on the detent 169 and the key can be depressed in order that a clerk may take a total from the "List" totalizer.

*Manager's lock.*

As previously mentioned herein, it is desired to so construct the machine so that the manager will be able to read and reset the "Clerks" totals and also the "Dept." totals, but not the "Trans." totals. The sliding plate 150 which normally obstructs the total lever slot is adapted to be moved by an insertible key 181 which is given to the manager. This key is inserted in a key barrel 182 (Figs. 7, 8 and 11) which is carried by a frame 183 supported by the rods 28 and 29. Secured to the key barrel is an eccentric 184 which cooperates with a slot formed in the plate 150. It can readily be seen from Fig. 8 that turning the key 181 in the key barrel will rotate the eccentric 184 and move the plate 150 to the right so as to remove said plate from its obstructing position in the total lever slot.

Figure 8:
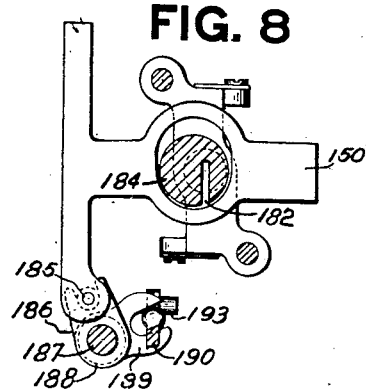
Fig. 8 is a detail top plan view of the lock bolt operated by the manager's key.
Figure 9:
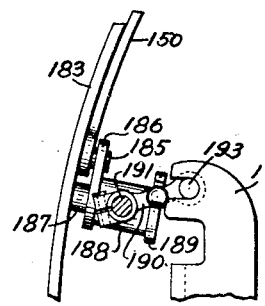
Fig. 9 is an enlarged detail side elevation of mechanism actuated by the operation of the manager's key.

At its lower end the plate 150 carries a pin 185 cooperating with the bifurcated end of an arm 186 pivoted on a stud 187 projecting inwardly from the frame 183 (Figs. 8 and 9). Connected to the arm 186 by a sleeve 188 surrounding stud 187 is an arm 189 which is bifurcated and cooperates with a ball portion of an arm 190 clamped on a shaft 191 which is the operating shaft of a consecutive counter 192 (Figs. 5 and 7) adapted to count the number of times the manager turns his key in the lock barrel 182. It is evident from the above description that when this key is turned clockwise in order to slide the plate 150 to the right, the pin 185 carried thereby will rock arm 186 clockwise (Fig. 8) which will also rock arm 189 to the same extent. As the bifurcated portion of arm 189 cooperates with the arm 190 this arm will also be rocked clockwise (Fig. 9) which will operate the consecutive counter.

The arm 190 has a projection carrying a pin 193 which projects through the bifurcated upper end of the plate 176 above mentioned. It will be remembered that this plate carries the pin 175 which cooperates with the slot 177 in plate 171. It will also be recalled that when the total lever is moved down to the "Clerks" position the plate 164 (Fig. 5) is slid towards the right thereby rocking the plate 171 into position to obstruct the tail 167 for the clerks' keys and preventing their depression.

When, however, the manager turns his key in the lock and through the above described mechanism the arm 190 is rocked clockwise the plate 176 will be moved downwardly due to the engagement of the pin 193 and the bifurcated end of said plate (Figs. 5 and 9). This movement of the plate will slide the plate 171 towards the right and the plates 164 and 171 will take the same relative positions to each other that they occupied previous to the movement of the total lever. The tail 167 for the clerks' keys is therefore free to move and the manager can operate them to take a total from the clerks' totalizers. If the manager desires to reset the totals on the "Dept." totalizers he must first insert and turn the key 181 to remove the obstructing plate 150 from the total lever slot. The total lever is then moved to the "Dept." position in which the back totalizer line is selected for engagement. The desired department key is then depressed and the machine released by the depression of the "List" key as previously described. The movement of the total lever to the "Dept." position will slide the plate 164 to such a position that there will be solid portions thereof in alinement with the tails 167 for the "Clerks" and "Trans." banks and therefore no keys in these banks can be depressed. It will be recalled that the depression of the "List" key has no effect on the detent 169 which rocks the tail 167 for the clerks' bank and therefore it can be used to release the machine when department totals are being taken.

It is not desired to have the manager reset the totals on the "Transaction" totalizers and the mechanism for preventing him from doing so will now be described. It is of course possible for the manager to move the total lever down to the "Transaction" position, which will select the front totalizer line for operation. This movement of the total lever will move the plate 164 to its extreme right hand position in which the tail 167 for the "Transaction" bank is free and those for the "Department" and "Clerks" keys are held against movement.

*Keys.*

Pivoted on a stud 200 (Fig. 1) on the key frame 33 for the release bank is an arm 201 having a tail 202 similar to the tails 167 above described. The tail 167 for the clerks' bank and the tail 202 are flexibly retained in their normal positions by an arm 213 (Fig. 1) fast on a shaft 214, supported by the key frame 33, which has a pin engaging the under side of the arms 168 and 201.

Figure 4:
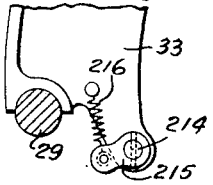
Fig. 4 is a detail view showing the spring for holding one of the detents in the release bank in its normal position.

Also fast on shaft 214 is an arm 215 (Fig. 4). A spring 216 is stretched between said arm and a pin on the key frame and tends to rock the arm 215, shaft 214, and arm 213 clockwise, which will hold the arms 168 and 201 in their normal positions. The arm 201 has an upwardly extending portion 203 which is adapted to be engaged by a shoulder 204 on the list key. It can be seen from the above that the arm 201 and tail 202 will be rocked clockwise upon every depression of the list key. On totalizing operations in which the lever is in either of its clerks' or department positions, the list key can be depressed, as there is no interference with the tail 202 therefor. When, however, the total lever is moved to the "Transaction" position, means is provided for obstructing the movement of said tail and thereby preventing the depression of the list key.

Slidably mounted on a shaft 205 (Figs. 1 and 5) are two blocks 206 and 207 which are normally held apart by a spring 208 extending into recesses in said blocks. The movement of the blocks is, however, limited by two collars 210 which are pinned to shaft 205. It is evident that the tail 202 for the list key can normally pass between blocks 206 and 207. However, when the total lever is moved to the transaction position the plate 164 will be moved to its extreme right hand position. The plate 164 has an upwardly extending portion 212 which is adapted to engage the block 207 and slide it on shaft 205 far enough to completely close the opening between the blocks and thereby prevent the movement of tail 202 and the list key. It is evident therefore that the manager cannot release the machine in order to take a total from any of the transaction totalizers. The block 207 is provided with a saw cut 211 into which the tail 167 swings upon depression of any one of the clerks' keys.

*Proprietor's lock.*

Figure 2:
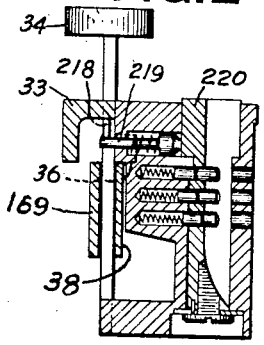
Fig. 2 is a section taken on line 2—2 of Fig. 1, looking in the direction of the arrows.
Figure 3:
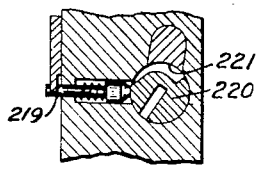
Fig. 3 is a detail sectional view taken through the "Read" key lock, showing the cam for throwing the lock bolt.

It is of course essential that the proprietor have access to all of the totalizers. He is equipped with a duplicate of the manager's key which will give him access to the clerks' and department totalizers. When he moves the total lever to the transaction position, however, it is necessary to provide means for releasing the machine for operation, as the list key is locked with the lever in the transaction position. In order to do this there is a key 34 (Figs. 1, 2 and 6) in the release bank which is marked the "Read" key. This key is normally locked and may only be unlocked by an insertible key in the possession of the proprietor. This key 34 is formed with a shoulder 218 beneath which is a spring-pressed pin 219 which cooperates with a key barrel 220. The spring on said pin constantly tends to move the pin towards the key barrel and away from its position beneath shoulder 218. The key barrel has a cut-away portion 221 (Fig. 3) thereon so arranged that when the proprietor inserts and turns his key counter-clockwise the spring will force the pin 219 into the cut-away portion 221. As it moves into the cut-away portion it will move out of engagement with the shoulder 218 and the proprietor can then depress the key.

This key carries a pin 36 which cooperates with a slot in the detent 38 and will therefore release the machine as above described.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a cash register, the combination of main operating mechanism, means for releasing said operating mechanism, a lever having a plurality of positions of adjustment from normal, and means actuated by the movement of said lever to one of its positions of adjustment for preventing the release of said main operating mechanism.

2. In a cash register, the combination of main operating mechanism, a depressible key for releasing said operating mechanism, a lever having a plurality of total controlling positions of adjustment, and means actuated by the movement of said lever to one of its positions for preventing the depression of said key to release the machine.

3. In a cash register, the combination of main operating mechanism, a depressible key for releasing said operating mechanism, a lever having a plurality of positions of adjustment, means actuated by the movement of said lever to one of its positions for preventing the depression of said key to release the machine, and means for preventing movement of said lever to the other positions of adjustment.

4. In a cash register, the combination of main operating mechanism, a depressible key for releasing said operating mechanism, a lever having a plurality of positions of adjustment, means actuated by the movement of said lever to one of its positions for preventing the depression of said key to release the machine, and a separate key not controlled by said lever for releasing the machine.

5. In a cash register, the combination of main operating mechanism, a depressible key for releasing said operating mechanism, a lever having a plurality of positions of adjustment, means actuated by the movement of said lever to one of its positions for preventing the depression of said key to release the machine, a separate key not controlled by said lever for releasing the machine, and means for preventing or permitting the depression of said last mentioned key.

6. In a cash register, the combination of main operating mechanism, a depressible key for releasing said operating mechanism, a lever having a plurality of positions of adjustment, means actuated by the movement of said lever to one of its positions for preventing the depression of said key to release the machine, a separate key not controlled by said lever for releasing the machine, and manually controlled means for preventing or permitting the depression of said last mentioned key.

7. In a machine of the class described, the combination of a movable lever, a bank of depressible keys cooperating therewith, a member adapted to be rocked by the depression of said keys, a slidable plate adapted to be moved by said lever, and means actuated by said plate for obstructing the movement of said rocking member and thus preventing the depression of said keys.

8. In a machine of the class described, the combination of a movable lever, a bank of depressible keys cooperating therewith, a member adapted to be rocked by the depression of said keys, a slidable plate adapted to be moved by said lever, and a separate key in said bank which is not affected by the movement of said plate.

9. In a machine of the class described, the combination of a movable lever, a bank of depressible keys cooperating therewith, a member adapted to be rocked by the depression of said keys, a slidable plate adapted to be moved by said lever, and a pivoted member adapted to be moved relatively by said plate in order to obstruct the movement of said rocking member and thereby prevent the depression of said keys.

10. The combination of a plurality of banks of control keys, an adjustable total control lever adapted to be moved into positions corresponding to said banks, and means for preventing movement of said lever to certain positions and for preventing depression of certain of the keys corresponding to the position into which said lever may be adjusted.

11. The combination of a plurality of banks of control keys, a total control lever adjustable into positions corresponding to said banks, a plate for obstructing movement of the lever into certain positions, and means controlled by said plate for preventing depression of certain keys of the bank corresponding to the available position of adjustment of the lever.

12. The combination of a plurality of banks of control keys, a total control lever adjustable into positions corresponding to said banks, a plate for obstructing movement of the lever into certain positions, means controlled by said plate for preventing depression of certain keys of the bank corresponding to the available position of adjustment of the lever, and means operated by said lever for moving said controlled means into functioning position.

13. The combination of a plurality of banks of control keys, a total control lever adjustable into positions corresponding to said banks, a plate for obstructing movement of the lever into certain positions, and means controlled by said plate and lever conjointly for locking out certain keys of the bank corresponding to the available positions of adjustment of the lever.

14. The combination of a plurality of banks of control keys, a total control lever movable into positions of adjustment corresponding to said banks of keys, means for preventing movement of said lever into certain of said positions, a slidable member controlled by said means, and a second slidable member operated by said control lever and operating upon said first mentioned slidable member for locking out certain keys of the bank corresponding to the available position of adjustment of the lever.

15. The combination of a plurality of banks of control keys, a total control lever movable into positions of adjustment corresponding to said banks of keys, means for preventing movement of said lever into certain of said positions, a slidable member controlled by said means, and a second slidable member operated by said control lever and operating upon said first mentioned slidable member for rocking it into position for locking out certain keys of the bank corresponding to the available position of adjustment of the lever.

16. The combination of a plurality of banks of control keys, a total control lever movable into corresponding positions of adjustment, a plate preventing movement of said lever into certain positions, means controlled by said plate for preventing depression of certain keys of a bank corresponding to the position of adjustment available, and a connection between said plate and the means controlled thereby for disabling said means upon movement of said plate to permit adjustment of said lever to said certain positions.

17. The combination of a plurality of banks of control keys, a total control lever movable into corresponding positions of adjustment, a plate preventing movement of said lever into certain positions, means controlled by said plate for preventing depression of certain keys of a bank corresponding to the position of adjustment available, means controlled by the total lever for actuating said plate controlled means, and means operated by said plate as it is moved into nonfunctioning position for presenting an actuation of said plate controlled means by said lever controlled means.

18. The combination of a bank of control keys comprising list and clerks' release keys, a total lever movable into a plurality of positions of adjustment, means for preventing depression of said clerks' keys when the lever is in one position of adjustment, and means for preventing depression of the list key when the lever is in another position of adjustment.

19. The combination of a bank of control keys comprising list and clerks' release keys, a total lever movable into a plurality of positions of adjustment, means for preventing depression of said clerks' keys when the lever is in one position of adjustment, means for permitting depression of the list key in another position of adjustment, and means for permitting depression of the list key in a third position of adjustment.

20. The combination of a bank of control keys comprising list and clerks' release keys, a total lever movable into a plurality of positions of adjustment, means for preventing depression of said clerks' keys while permitting depression of said list key when the lever is in one position of adjustment, and means for preventing depression of the list key when the lever is in another position of adjustment.

21. The combination of a bank of control keys comprising release keys, a total lever movable into a plurality of positions of adjustment, means for preventing depression of certain of said keys when the lever is in one position of adjustment, and means for preventing depression of another key when the lever is in another position of adjustment.

22. The combination of a bank of control keys comprising a total lever movable into a plurality of positions of adjustment, means for preventing depression of certain of said keys when the lever is in one position of adjustment, means for permitting depression of another key when the lever is in another position of adjustment, and means for preventing depression of said other key when the lever is in a third position of adjustment.

23. The combination of a bank of control keys comprising release keys, a total lever movable into a plurality of positions of adjustment, means for preventing depression of certain of said keys while permitting depression of another of said keys when the lever is in one position of adjustment, and means for preventing depression of said other key when the lever is in another position of adjustment.

24. The combination of a plurality of banks of control keys including a bank of release keys, a total lever movable to positions corresponding to said banks of keys, means for locking out certain of said release keys when the lever is in a position corresponding to said bank, and means for locking out one of said release keys when the lever is in another position.

25. The combination of a plurality of banks of control keys including a bank of release keys, a total lever movable to positions corresponding to said banks of keys, means for locking out certain of said release keys when the lever is in a position corresponding to said bank, and means for locking out another of said release keys when the lever is in another position.

26. The combination of a plurality of banks of control keys including a bank of release keys, a total lever movable to positions corresponding to said banks of keys, means for locking out certain of said release keys when the lever is in a position corresponding to said bank, means for locking out one of said release keys when the lever is in another position, other means for locking out said certain keys when the lever is in other positions and permitting depression of key in one of said latter positions, and a third means for locking out said one key in the other of said latter positions.

27. The combination of a bank of release keys, an adjustable lever, a slidable member directly actuated by said lever, means on said member for locking out certain of said keys in certain positions of said lever, means operated by said member for locking out said keys in another position of said lever, and another means operated by said member for locking out another key in one position of said lever.

28. The combination of a bank of release keys, an adjustable lever, a slidable member directly actuated by said lever, means on said member for locking out certain of said keys in certain positions of said lever, pivoted means operated by said member for locking out said keys in another position of said lever, and slidable means operated by said member for locking out another key in one position of said lever.

In testimony whereof I affix my signature.

BERNIS M. SHIPLEY.